June 5, 1934.    J. O. ALMEN    1,961,323
BEVEL DRIVE PINION MOUNTING
Filed June 28, 1933    2 Sheets-Sheet 1

Inventor
John O. Almen
By Blackmore, Spencer & Hirt
Attorneys

June 5, 1934.  J. O. ALMEN  1,961,323
BEVEL DRIVE PINION MOUNTING
Filed June 28, 1933  2 Sheets-Sheet 2
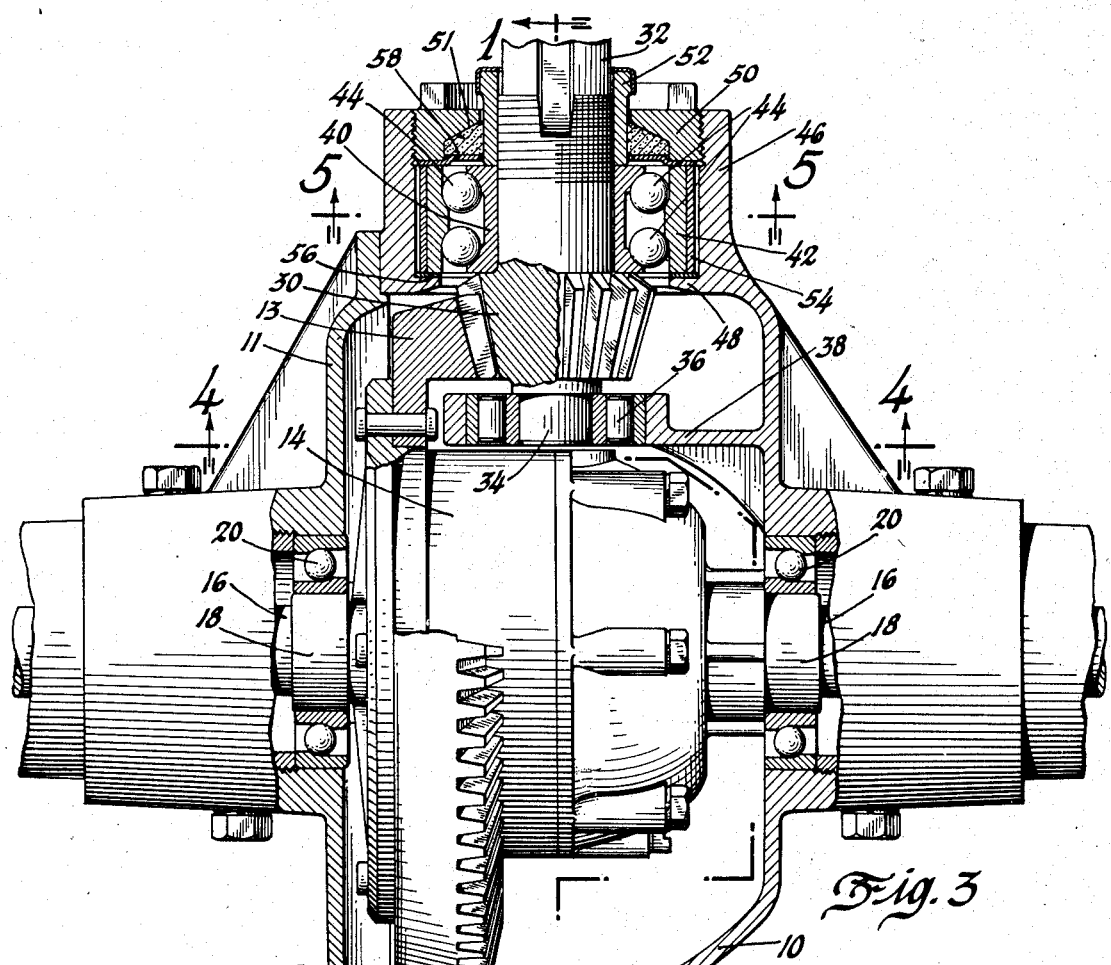
Fig. 3
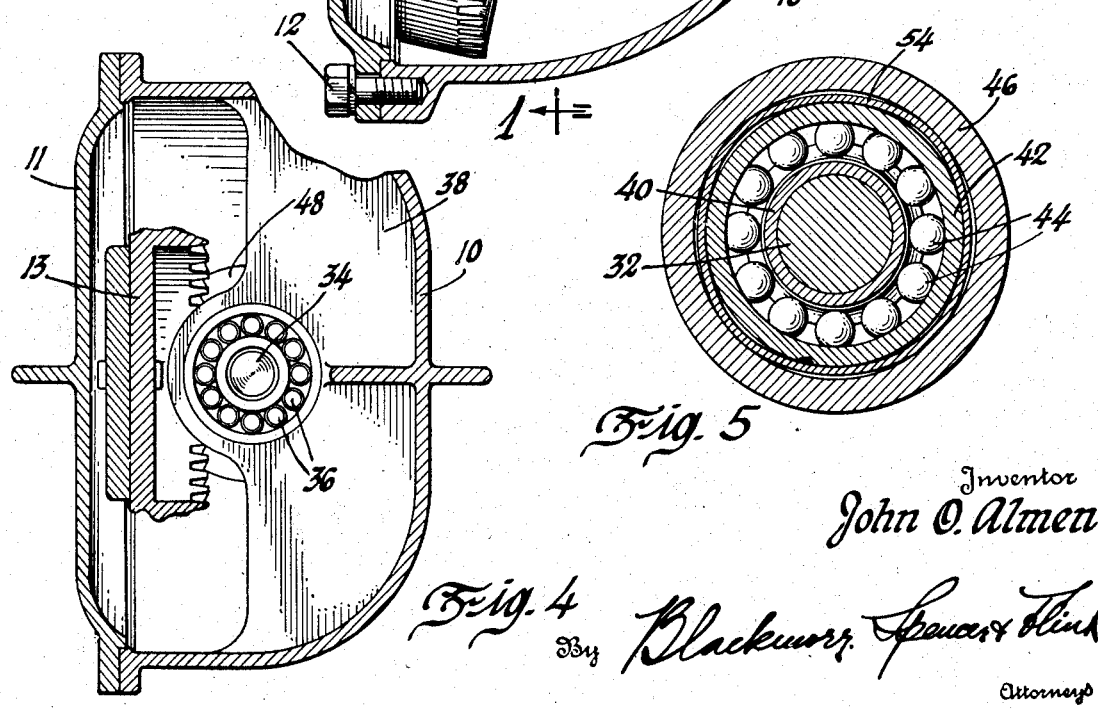
Fig. 4
Fig. 5
Inventor
John O. Almen
By Blackmore, Spencer & Flink
Attorneys Patented June 5, 1934

1,961,323

UNITED STATES PATENT OFFICE 1,961,323

BEVEL DRIVE PINION MOUNTING

John O. Almen, Royal Oak, Mich., assignor to General Motors Research Corporation, Detroit, Mich., a corporation of Delaware Application June 28, 1933, Serial No. 677,988

5 Claims. (Cl. 74—7)

This invention relates to means for mounting the driving pinion of a gear pair,—particularly the pinion at one end of an automobile propeller shaft that drives the ring gear of the differential on the driving axle.

The object of the invention is to preserve that relation of the coacting pressure surfaces of the teeth of driving pinion and driven gear which is necessary to distribute tooth contact pressure over the full length of the teeth in contact, even though the pinion be deflected owing to intensity of force transmitted through the driving pinion to the driven gear.

The invention comprises the combination of a driving and driven gear, both having straight, spiral, or skewed teeth, with straddle bearings for the pinion arranged to constrain the axis of the latter to move, when subjected to a driving force capable of deflecting it, substantially around the axis of the driven gear.

In the drawings, which illustrate one embodiment of the invention, and in which like reference characters indicate like parts throughout the several views:

Figure 3 is a plan view of the central enlarged portion of an automobile driving axle housing, partly in section, exposing to view an embodiment of the invention.

Figure 4 is a sectional view on line 4—4 of Figure 3, and

Figure 5 is a sectional view on line 5—5 of Figure 3.

Figure 1:
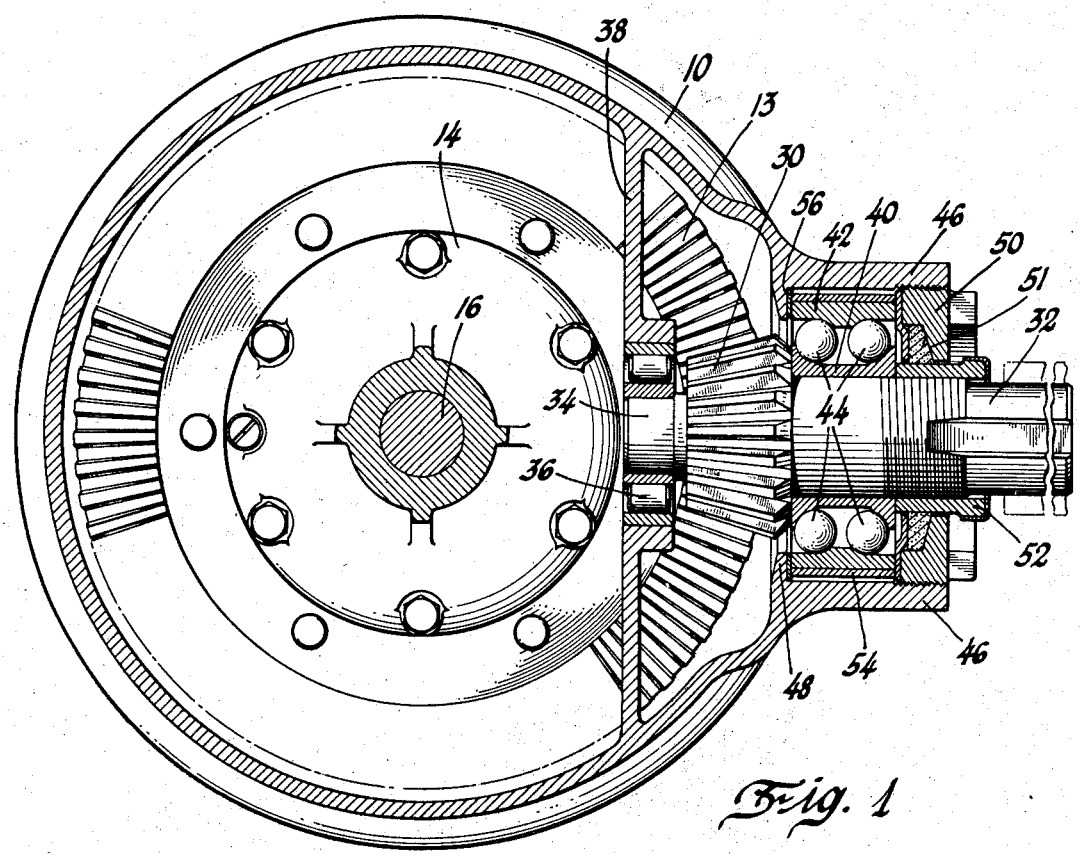
Figure 1 is a transverse section on planes indicated by line 1—1 of Figure 3.

In the illustrated embodiment of the invention, the central enlargement of an automobile driving axle housing, consisting of parts 10 and 11, secured together as by bolts 12, incloses and supports a differential gearing of common type comprising a bevel ring gear 13 (which may have straight or spiral teeth) fixed to a differential casing 14, which, it will be understood, carries within it, as is customary, differential pinions in mesh with two differential side gears respectively keyed to the inner ends of driving axle shafts 16 passing freely through alined hubs 18 on opposite ends of this casing. The oppositely projecting alined hubs 18 are journaled as usual in the axle housing 10—11 by anti-friction bearings 20.

Numeral 30 indicates a bevel driving pinion provided with straight or spiral teeth meshing with the teeth of the ring gear 13. Pinion 30 is rigid with the power output end of driving shaft 32, the axis of which is, course, disposed transversely of the axis of gear 13 and shafts 16. Power derived from a prime mover is transmitted to the axle shafts 16 through shaft 32, pinion 30, ring gear 13, differential casing 14 and the differential pinions carried by the casing in mesh with the side gears splined to the axle shafts within the casing (not shown).

As the loads upon the teeth of driving pinion 30 and ring gear 13 are extremely heavy at times, it is important that the teeth be disposed and remain under all loads in such relation to one another as to distribute the load as evenly as possible over the predetermined pressure-receiving areas of the teeth in contact during operation. When subjected to very high driving torque, the axis of the driving pinion will be displaced. If the proper relation of the teeth is not preserved when the driving pinion is displaced under strong driving torque the tooth loads are not distributed over the full length of the teeth in contact, as they should be to operate at lowest unit pressures, but are localized so that unit contact pressure becomes exceedingly high, with the result that the contact surfaces become pitted and scored or even that the teeth break.

In this invention means are provided whereby drive pinion 30 and ring gear 13 are relatively positioned so as to dispose the pressure surfaces of their teeth in the correct relationship to effect lowest possible unit pressure and to assist in maintaining the teeth in this correct relationship even though the force transmitted from driving pinion to driven gear be so great as to sensibly deflect or displace the axis of the driving pinion.

In order to achieve the desired result, according to this invention, the inner extremity 34 of driving shaft 32, protruding from the small end of pinion 30, and hence disposed between said pinion and the line of the axis of gear 13 and shafts 16, is rotatably mounted in a bearing 36 (which is preferably a roller bearing composed of inner and outer inserted races with rollers interposed) supported by a web-like member 38, preferably formed integral with the axle housing enlargement 10; while drive shaft 32, at a zone adjacent large end of pinion 30, is mounted in an outer bearing (preferably of ball type adapted to resist both radially and axially directed forces), which is composed of an inner race 40, an outer race 42 and interposed balls 44.

Web-like inner bearing supporting member 38 extends up and down entirely across the space within housing part 10 as shown in Figure 1, and laterally far enough across said space to include the bearing 36, but affords clearance for ring gear 13 as shown in Figure 4. Inner bearing supporting member 38, therefore, is held by its attachment on three edges to the housing part 10, and is, preferably, integral therewith as stated.

In a preferred embodiment the supporting means for the outer bearing consists of tubular protuberance 46,—preferably integral with housing part 10. At its inner end the support 46 is formed with an annular, inward-extending stop flange 48, of internal diameter greater than the external diameter of pinion 30, and at its outer end with an internal thread to fit an externally threaded adjusting and packing ring 50, dished at 51, which surrounds with slight clearance an adjusting nut 52 threaded on shaft 32 as shown. As one means to allow slight lateral deflection of driving shaft and pinion (particularly in a plane perpendicular to the axis of ring gear 13) without substantially disturbing correct relationship of the pressure areas of the teeth, elastic means, such as an annular sinuous spring 54, may be disposed between the outer periphery of outer race 42 and the inner periphery of the tubular support 46. A thin washer 56 may be disposed between stop flange 48 and the inner edges of outer race 42 and spring 54. Numeral 58 indicates a packing retaining washer interposed between ring 50 and the outer edges of race 42 and spring 54. Washer 58 retains packing material in the cavity formed between it and the dished wall of the cavity in ring 50. Slight clearance between the inner periphery of washer 58 and nut 52, and the similar clearance described between ring 50 and nut 52 provide for slight deflection of shaft 32 should it yield laterally with the bearings.

So-called straddle bearings, in which a driving pinion for a bevel gear is disposed between inner and outer bearings arranged close to the pinion, as shown in the accompanying drawings, have been hitherto used in automobile final drives; but insofar as applicant is aware, in prior arrangements of this type both the shaft and the inner and outer bearings have been made as rigid and unyielding as possible in an effort to prevent any sensible deflection of the axis of the driving shaft. In a bevel gear drive of either straight or spiral toothed gearing, where the axial line of the drive pinion lies normally in a definite plane including or parallel to the driven gear axis, it is obvious that very slight displacement of the driving pinion axis out of said plane will materially disturb the relationship of the pressure surfaces of the teeth and tend to localize tooth contact, thereby producing excessively high unit contact pressure which is injurious to the teeth. Owing to the elasticity of the metal of which gears, shaft, bearings, and bearing supports are composed, it is practically impossible to maintain the precise theoretically correct relationship of the teeth of driving pinion and driven gear during the transmission of great force from the driving shaft to the driven shaft, even when straddle bearings of highest practicable rigidity are used to position the driving shaft, because the axis yields slightly laterally with the bearings, or bows between them.

Another known and commonly used type of final drive for rear axle differentials is provided with bearings for the drive shaft wholly outward of the pinion, which is unsupported between its inner smaller end and the axis of the driven gear. In this type excessive force transmitted from the driving pinion to the driven gear causes the shaft and pinion to bend around a fulcrum in the bearing outside of the pinion, and the axis of the pinion to cock to one side or the other of the normal plane of operation sufficiently to disturb the correct relationship of the pressure surfaces on the teeth.

Figure 2:
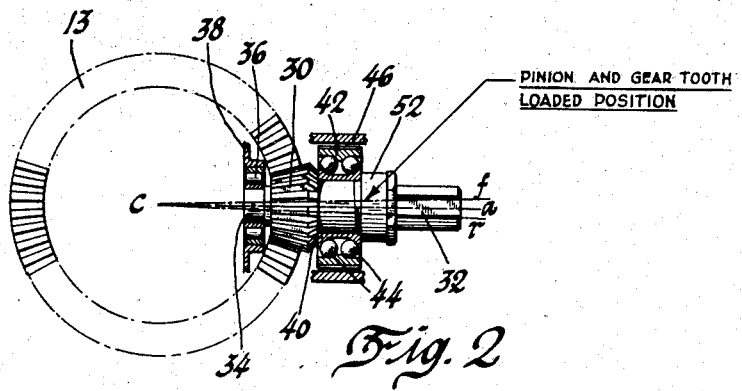
Figure 2 is a diagram illustrating deflection, under heavy load, of a driving pinion mounted in accordance with this invention.

According to this invention, as diagrammatically shown in Figure 2, means are provided such that a force transmitted from driving pinion to driven gear, having a component of magnitude sufficient to displace the axis of the pinion in a plane perpendicular to the driven gear axis, will cause displacement of the pinion axis substantially around the axis of the driven gear as a center. Displacement of this kind obviously does not disturb the relationship of the pressure surfaces of the teeth. In the means illustrated the axis of the driving shaft outward of the pinion center yields more than it does inward of the pinion center. This result may be achieved by several different means. In the means shown, the outer bearing is mounted to yield more than the inner under a given force, and the degree of yield of the two bearings, one relative to the other, and to the axis of the driven gear, is so established in the fabrication of the parts that the pinion axis will deflect around said driven gear axis, in response to a force acting perpendicularly to a plane including both the gear and pinion axes, and the extension of said pinion axis will therefore at all times substantially intersect the line of the driven gear axis.

In the diagram, Figure 2, it is assumed that the drive shaft 32 rotates clockwise, viewed from the right, in accordance with usual automobile operation during forward travel. When no torque or light torque is transmitted by shaft 32, the line of its axis is in the direction $a$—$c$. When great force is being transmitted in the forward driving direction, the line of the axis of the driving pinion, it is obvious, tends to assume the position and direction $f$—$c$, since the pinion tends to roll upward on the ring gear. In reverse driving the pinion tends to roll downward on the driven gear and if the torque is high enough the axial line of pinion 30 may assume the position $r$—$c$. Of course, high torque is seldom transmitted in reverse driving and distortion under this condition is rarely substantial.

It will be apparent, on reflection, that the force transmitted from the bevel driving pinion to the driven gear in the construction shown is resolvable into three component forces: a first acting perpendicularly to a plane including the axes of the driven gear and driving pinion, a second acting perpendicularly to the plane of the driven gear in a sense away from the gear, and a third acting in a direction away from the axis of the driven gear along the axis of the driving gear. It is the first mentioned component of the force transmitted by the driving pinion that tends to bend or displace the axis of said pinion out of its normal plane, which is rendered substantially ineffective to reduce the areas of tooth contact by this invention.

I claim:

1. In mechanism of the class described, a driven bevel gear and a driving pinion in mesh with the bevel gear; a driving shaft to which the pinion is secured; an inner supporting bearing for the driving shaft adjacent the smaller end of the pinion; an outer supporting bearing for the driving shaft adjacent the larger end of the pinion; and elastic means constructed and arranged to permit the axis of the shaft outward of the pinion center to yield to laterally directed force exerted on the pinion to a greater degree than within the inner bearing.

2. In mechanism of the class described, a driven bevel gear and a driving pinion in mesh with the driven gear; a driving shaft to which the pinion is secured; an inner supporting bearing for the driving shaft adjacent the smaller end of the pinion; an outer supporting bearing for the driving shaft adjacent the larger end of the pinion; and elastic means arranged to support the shaft and outer bearing constructed to yield to a given force exerted on the pinion perpendicularly to a plane including the axes of gear and pinion to a greater degree than that portion of the shaft supported by the inner bearing.

3. In mechanism of the class described, a driven bevel gear and a driving pinion in mesh with the driven gear; a driving shaft to which the pinion is secured; an inner supporting bearing for the driving shaft adjacent the smaller end of the pinion; an outer bearing for the driving shaft adjacent the larger end of the pinion; supporting means for the outer bearing; and elastic means disposed between the outer bearing and bearing supporting means arranged to permit the outer bearing and shaft to yield laterally.

4. In mechanism of the class described, a driven bevel gear and a driving pinion in mesh with the driven gear; a driving shaft to which the pinion is secured; an inner supporting bearing for the driving shaft adjacent the smaller end of the pinion; an outer bearing for the driving shaft adjacent the larger end of the pinion, and bearing supporting means having a bore for receiving the outer bearing; and a sinuous spring ring encircling the outer bearing between the outer bearing and inner periphery of the bore in the bearing supporting means.

5. In mechanism of the class described, a driven gear and a driving pinion in mesh with the driven gear; a driving shaft to which the pinion is secured; means tending to hold the axis of the driving shaft and pinion in definite relation to preserve theoretically correct tooth contact areas, and means constraining the pinion axis to yield substantially in an arc about the center of the driven gear if displaced by a force acting perpendicularly to the plane normally containing the axes of the driven gear and driving pinion.

JOHN O. ALMEN.